US009556902B2

(12) United States Patent
Blunier et al.

(10) Patent No.: US 9,556,902 B2
(45) Date of Patent: Jan. 31, 2017

(54) AGRICULTURAL TANDEM PIVOT ASSEMBLY

(71) Applicant: CNH Industrial America LLC, New Holland, PA (US)

(72) Inventors: Timothy R. Blunier, Danvers, IL (US); Joshua Bell, Peoria, IL (US)

(73) Assignee: CNH Industrial America LLC, New Holland, PA (US)

( * ) Notice: Subject to any disclaimer, the term of this patent is extended or adjusted under 35 U.S.C. 154(b) by 21 days.

(21) Appl. No.: 14/487,426

(22) Filed: Sep. 16, 2014

(65) Prior Publication Data

US 2015/0125102 A1    May 7, 2015

Related U.S. Application Data

(60) Provisional application No. 61/901,097, filed on Nov. 7, 2013.

(51) Int. Cl.

| | | |
|---|---|---|
| *F16C 27/02* | (2006.01) |
| *F16C 11/04* | (2006.01) |
| *B60G 5/02* | (2006.01) |
| *E02F 9/00* | (2006.01) |
| *F16C 17/02* | (2006.01) |

(52) U.S. Cl.
CPC ............... *F16C 27/02* (2013.01); *B60G 5/02* (2013.01); *E02F 9/00* (2013.01); *F16C 11/045* (2013.01); *B60G 2300/08* (2013.01); *F16C 17/02* (2013.01); *Y10T 29/49826* (2015.01)

(58) Field of Classification Search
CPC ......... F16C 11/045; F16C 17/02; F16C 17/10; F16C 17/26; F16C 27/02; F16C 27/063; F16C 31/02; F16C 35/02; F16C 33/04; F16C 33/06; F16C 33/08; F16C 11/00; F16C 11/02; F16C 11/04; B60G 2200/318; B60G 5/02; B60G 5/04; E02F 9/00
See application file for complete search history.

(56) References Cited

U.S. PATENT DOCUMENTS

| | | | | |
|---|---|---|---|---|
| 704,321 | A * | 7/1902 | Greenwood | F16C 11/045 403/154 |
| 1,428,252 | A * | 9/1922 | Ortman | B60G 11/12 267/268 |
| 2,240,709 | A * | 5/1941 | Mead | B60G 11/12 267/269 |
| 2,276,049 | A * | 3/1942 | Leighton | B60G 11/12 403/242 |
| 2,819,105 | A * | 1/1958 | Behnke | B60D 1/50 403/224 |
| 3,632,128 | A * | 1/1972 | Raidel | B60G 5/04 267/257 |
| 4,188,146 | A * | 2/1980 | Stecklein | E02F 9/006 172/273 |

(Continued)

FOREIGN PATENT DOCUMENTS

JP    2950752 B2 *   9/1999 ............ E02F 3/3411

*Primary Examiner* — Alan B Waits
(74) *Attorney, Agent, or Firm* — Rebecca L. Henkel; Rickard K. DeMille

(57) ABSTRACT

An agricultural implement including a pair of support members and a pivot assembly coupled between the support members. The pivot assembly includes at least one resilient bushing and a side-play restraint system. The resilient bushing being in contact with a portion of the restraint system.

6 Claims, 4 Drawing Sheets

(56) References Cited

U.S. PATENT DOCUMENTS

| | | | | |
|---|---|---|---|---|
| 4,325,589 A * | 4/1982 | Hirt | ................... | F16C 17/02 |
| | | | | 384/375 |
| 4,435,100 A * | 3/1984 | Cox | ................... | F16B 31/00 |
| | | | | 16/378 |
| 4,573,728 A * | 3/1986 | Johnson | ................... | B66C 3/005 |
| | | | | 188/366 |
| 4,582,436 A * | 4/1986 | Merron | ................... | E02F 9/121 |
| | | | | 384/593 |
| 4,619,544 A * | 10/1986 | Laidely | ................... | B60G 5/02 |
| | | | | 16/2.1 |
| 4,655,296 A * | 4/1987 | Bourgault | ................... | A01B 63/22 |
| | | | | 172/400 |
| 5,120,195 A * | 6/1992 | Schmaling | ................... | B64C 27/35 |
| | | | | 384/221 |
| RE34,659 E * | 7/1994 | Reilly | ................... | B60G 5/02 |
| | | | | 105/222 |
| 5,655,615 A * | 8/1997 | Mick | ................... | B60G 5/02 |
| | | | | 180/24.02 |
| 5,676,471 A * | 10/1997 | Kallenberger | ................... | B66C 23/84 |
| | | | | 384/593 |
| 6,003,616 A * | 12/1999 | Goins | ................... | A01B 73/00 |
| | | | | 172/669 |
| 6,279,931 B1 * | 8/2001 | Kopczynski | ................... | B60G 9/02 |
| | | | | 280/124.111 |
| 6,331,010 B1 * | 12/2001 | Chino | ................... | B60G 13/001 |
| | | | | 280/124.112 |
| 6,397,953 B1 * | 6/2002 | Ankenman | ................... | A01B 51/04 |
| | | | | 172/445.1 |
| 6,694,571 B2 * | 2/2004 | Albright | ................... | E02F 9/006 |
| | | | | 16/380 |
| 7,204,319 B2 * | 4/2007 | Hoehn | ................... | A01B 73/044 |
| | | | | 172/311 |
| 7,367,739 B2 * | 5/2008 | Brock | ................... | F16J 15/3236 |
| | | | | 403/288 |
| 7,748,908 B2 * | 7/2010 | Aira | ................... | E02F 9/006 |
| | | | | 384/130 |
| 7,827,832 B2 * | 11/2010 | Eckert | ................... | D06F 37/22 |
| | | | | 68/140 |
| 7,878,752 B2 * | 2/2011 | Schmeling | ................... | E02F 9/006 |
| | | | | 37/468 |
| 8,002,489 B2 * | 8/2011 | Mahy | ................... | F16C 11/0614 |
| | | | | 267/141.2 |
| 8,042,596 B2 * | 10/2011 | Llagostera Forns | ................... | E04F 10/0622 |
| | | | | 160/70 |
| 8,186,449 B2 * | 5/2012 | Hackert | ................... | A01B 63/16 |
| | | | | 172/288 |
| 8,596,603 B2 * | 12/2013 | Gallet | ................... | F01D 25/162 |
| | | | | 244/53 R |
| 8,596,666 B1 * | 12/2013 | Hansen | ................... | F16C 33/7886 |
| | | | | 280/515 |
| 8,596,870 B2 * | 12/2013 | Akita | ................... | E02F 9/006 |
| | | | | 277/562 |
| 8,679,400 B2 * | 3/2014 | Takayama | ................... | B22F 3/10 |
| | | | | 228/199 |
| 9,151,321 B2 * | 10/2015 | Hodgins | ................... | B66C 3/005 |
| 2005/0163408 A1 * | 7/2005 | Wakabayashi | ................... | E02F 9/006 |
| | | | | 384/279 |
| 2006/0093246 A1 * | 5/2006 | Akita | ................... | E02F 9/006 |
| | | | | 384/279 |
| 2008/0290724 A1 * | 11/2008 | Wargh | ................... | B60B 35/18 |
| | | | | 301/125 |
| 2013/0048400 A1 * | 2/2013 | Holdener | ................... | B60R 3/02 |
| | | | | 180/89.1 |
| 2013/0142606 A1 * | 6/2013 | Wager | ................... | E02F 3/3695 |
| | | | | 414/686 |
| 2013/0263767 A1 * | 10/2013 | Trevino | ................... | A01C 7/06 |
| | | | | 111/121 |
| 2015/0016761 A1 * | 1/2015 | Akita | ................... | E02F 9/006 |
| | | | | 384/125 |
| 2015/0023771 A1 * | 1/2015 | Carr | ................... | B66C 1/68 |
| | | | | 414/686 |

* cited by examiner

AGRICULTURAL TANDEM PIVOT ASSEMBLY

CROSS REFERENCE TO RELATED APPLICATIONS

This is a non-provisional application based upon U.S. provisional patent application Ser. No. 61/901,097 entitled "AGRICULTURAL TANDEM PIVOT ASSEMBLY", filed Nov. 7, 2013, which is incorporated herein by reference.

BACKGROUND OF THE INVENTION

1. Field of the Invention

The present invention relates to agricultural implements, and, more particularly, to a resilient bearing assembly used with a walking tandem axle on an agricultural implement.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed. The depth of the implement is controlled by a system that uses wheels carried by a pivoting axle assembly.

The axle assembly may be in the form of a walking beam assembly, simply called a walking axle, or a walking tandem assembly. The walking tandem assembly includes two axles for wheels with a pivoting coupling located between the axles. The pivoting coupling is connected to a support structure of the implement, which transfers some of the weight of the implement to the wheels coupled to the axles.

The prior art pivoting couplings use tapered roller bearings, which require greasing and which have undesirable failure modes, such as, brinelling, contamination, and are subject to improper bearing setting.

What is needed in the art is a bearing assembly that can eliminate the need for tapered rolling bearings and their associated failure modes. And to make the assembly less prone to failure.

SUMMARY OF THE INVENTION

The present invention provides a tillage implement with walking tandem axle assemblies having resilient bearings and a side play restraint system.

The invention in one form is directed to an agricultural implement including a pair of support members and a pivot assembly coupled between the support members. The pivot assembly includes at least one resilient bushing and a side-play restraint system. The resilient bushing being in contact with a portion of the restraint system.

The invention in another form is directed to a pivot assembly for use with an agricultural implement having a pair of support members. The pivot assembly is coupled between the support members. The pivot assembly includes at least one resilient bushing and a side-play restraint system. The resilient bushing being in contact with a portion of the restraint system.

The invention in another form is directed to a method of securing a pivot assembly to support members of an agricultural implement including the steps of carrying at least one resilient bushing on a side play restraint system; and rigidly coupling the support members to the side play restraint system.

An advantage of the present invention is that it extends the life of the pivoting assembly.

Another advantage of the present invention is that it is applicable to a large number of tillage equipment platforms.

Yet another advantage is that the present invention can be applied to legacy equipment, thereby reducing retrofit costs.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate some embodiments of the invention and such exemplifications are not to be construed as limiting the scope of the invention in any manner.

DETAILED DESCRIPTION OF THE INVENTION

Figure 1:
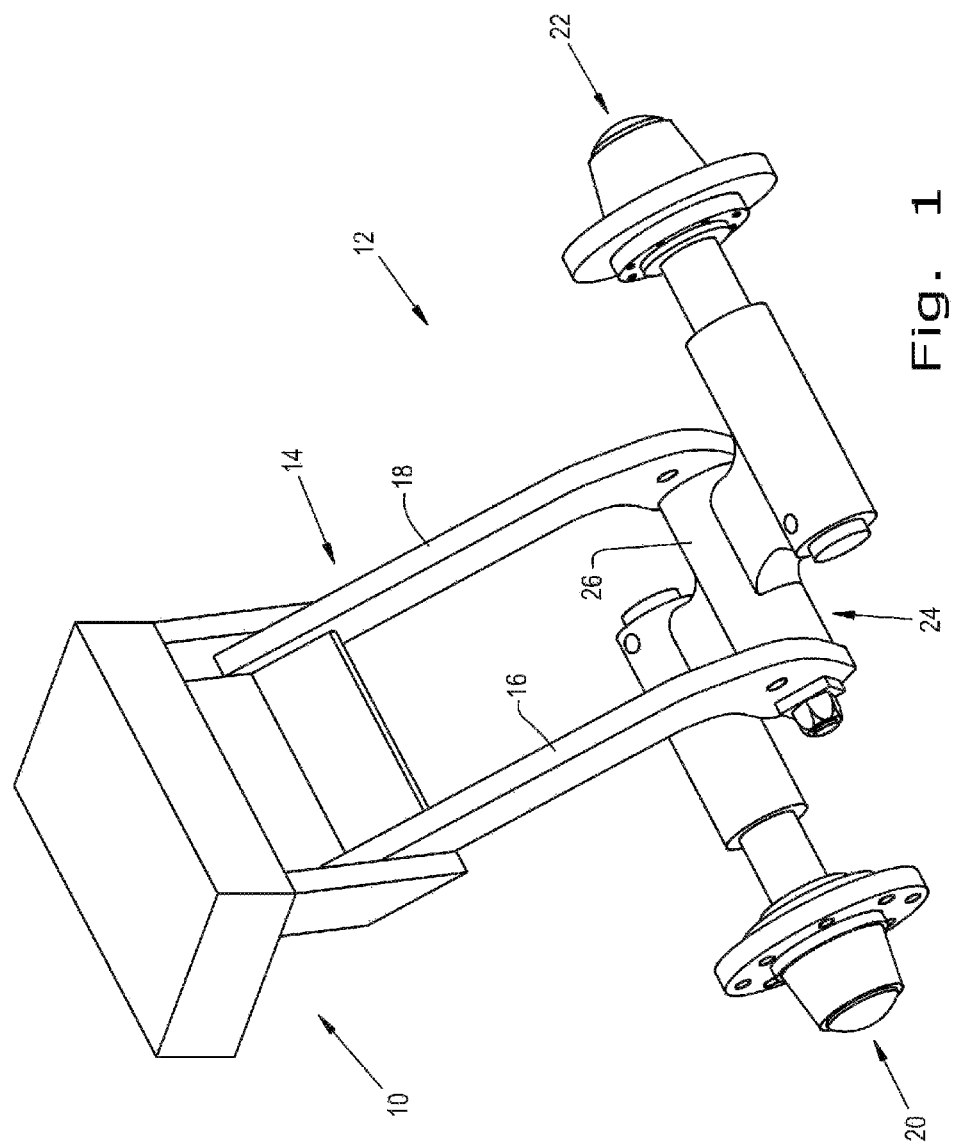
FIG. 1 is a perspective view of an agricultural implement using an embodiment of a tandem axle assembly of the present invention.
Figure 5:
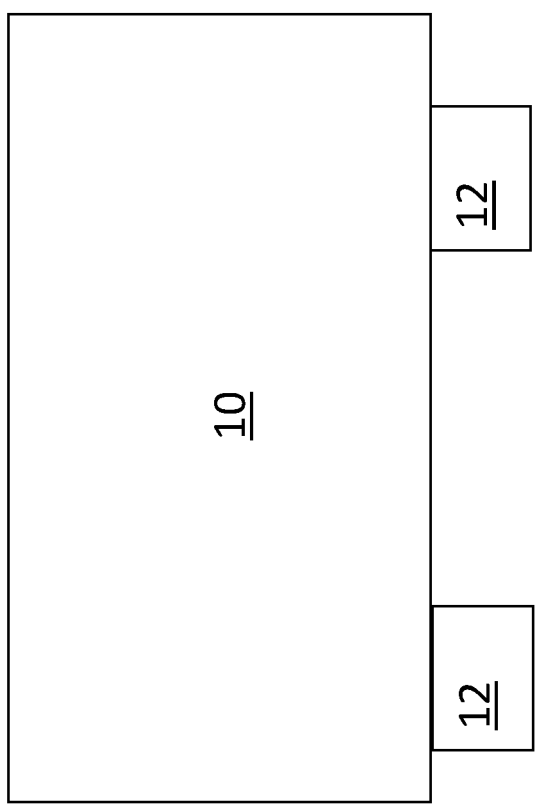
FIG. 5 is a schematical representation of the agricultural implement presented in FIG. 1.

Referring now to the drawings, and more particularly to FIGS. 1 and 5, there is shown an embodiment of a tillage implement 10 of the present invention, mainly shown in abstract as a block combined with details of the present invention. Tillage implement 10 includes a walking tandem axle assembly 12 connected to a support assembly 14 of implement 10. Support assembly 14 is part of tillage implement 10 that is towed by a traction unit, such as by an agricultural tractor (not shown). Support assembly 14 has support members 16 and 18 that extend downward and connect to walking tandem axle assembly 12.

Figure 3:
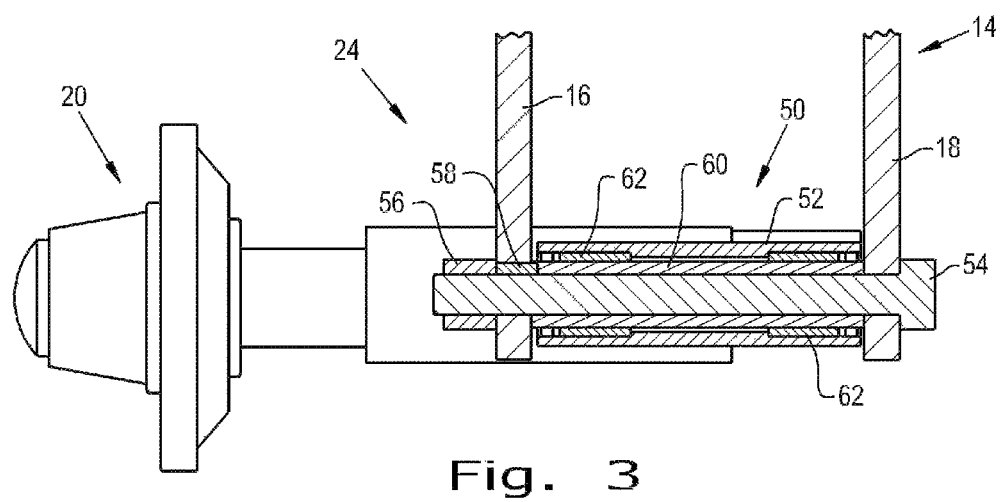
FIG. 3 is a partially sectioned view of another embodiment of a pivot assembly used in the tandem axle assembly of FIG. 1.
Figure 4:
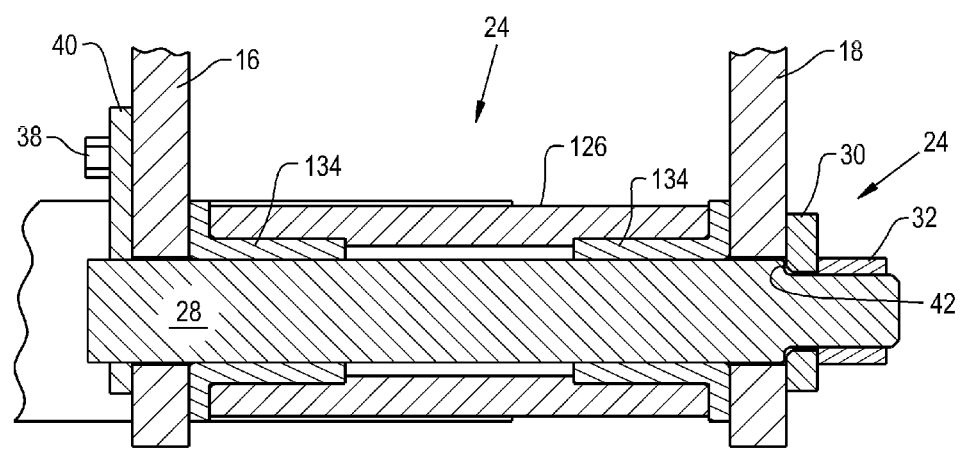
FIG. 4 is a partially sectioned view of yet another embodiment of a pivot assembly used in the tandem axle assembly of FIG. 1.

Walking tandem axle assembly 12 includes a wheel axle 20, a wheel axle 22 and a pivot assembly 24. The axes of axles 20 and 22 and the axis of pivot assembly 24 may be substantially parallel. A structural member 26 serves as a housing 26 for elements of pivot assembly 24. Three embodiments of pivot assembly 24 are separately illustrated in FIGS. 2-4, with the pivot assembly of FIG. 3 being designated as pivot assembly 50, for the sake of distinguishing between the embodiments. FIG. 4 is a variation of the embodiment illustrated in FIG. 2. Each embodiment has a side play restraint system that is composed of a series of parts identified herebelow.

Pivot assembly 24 includes housing 26, a flag pin 28, a spacer plate 30, a nut 32, bushings 34, and thrust washers 36. A bolt 38 extends through a flag 40 of flag pin 28. Flag pin also includes a shoulder 42. Bushings 34 have a seal 44 to seal the bushings from moisture and from abrasive particles. Spacer plate 30 is secured to support member 18 and may be welded thereto. During assembly flag pin 28 is inserted through a hole in support member 16, a thrust washer 36, bearings 34 (positioned in housing 26), another thrust washer 36, and support member 18. Nut 32 is threaded onto an end of flag pin 28 drawing shoulder 42 against a part of spacer plate 30 to thereby rigidly affix an end of flag pin 28 to support member 18. Bolt 38 is threaded into a threaded opening in support member 16, thereby rigidly affixing flag pin 28 to support member 16. This construct effects a rigidly defined spacing between support members 16 and 18, thereby allowing housing 24 to have some lateral movement along flag pin 28. The side play restraint system of this embodiment includes flag pin 28, plate 30, nut 32, and bolt 38, and of course relies on the presence of flag 40 and shoulder 42.

Pivot assembly 50 includes housing 52, a bolt 54, a nut 56, a key 58, sleeve 60 and bushings 62. Bushings 62 similar to bushings 34 may have a seal to seal the bushings from moisture and from abrasive particles. During assembly bolt 54 is inserted through a hole in support member 18, sleeve 60, a hole in support member 16, and key 58 is inserted into a keyway, allowing key 58 to extend into a recess in sleeve 60. Nut 56 is threaded onto an end of bolt 54 drawing support members 16 and 18 against opposite ends of sleeve 60 to thereby rigidly affix both support member 16 and support member 18 together. This construct effects a rigidly defined spacing between support members 16 and 18, thereby allowing housing 52 to have some lateral movement along bolt 54. Thrust washers 36 of the previous embodiment may be used in this embodiment as well, and are optional in the previous embodiment. The side play restraint system of this embodiment includes bolt 54, nut 56, and sleeve 60, and of course relies on the presence of key 58 and a corresponding keyway and recess in sleeve 60.

Key 58 and the keyway in support member 16 along with the recess in sleeve 60 serve to prevent sleeve 60 from rotating about bolt 54. A feature of the second embodiment is that sleeve 60 allows the bearing surface of bushings 62 to have a larger internal diameter, which results in a larger bearing surface to carry larger loads.

Figure 2:
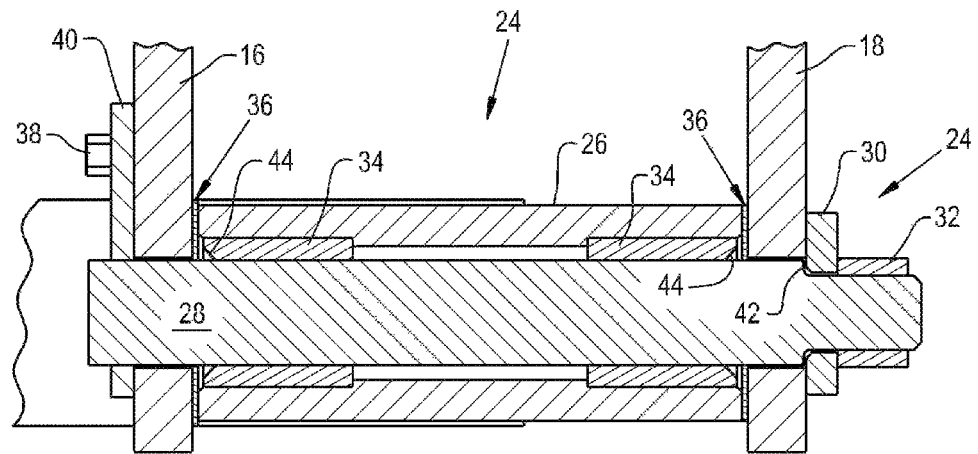
FIG. 2 is a partially sectioned view of an embodiment of a pivot assembly used in the tandem axle assembly of FIG. 1.

In FIG. 4 there is illustrated an embodiment of the present invention similar to the one illustrated in FIG. 2, with a housing 126 and flange bushings 134 as the different elements. Flange bushings 134 replace the combination of bushings 34, thrust washers 36 and seals 44.

An advantage of the present invention is that it extends the life of the bearing. Another advantage is that the present invention is applicable to a large number of tillage equipment platforms. Yet another advantage is that the present invention is easily applied to legacy equipment, thereby reducing retrofit costs.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pivot assembly for use with an agricultural tillage implement having support members coupled to the pivot assembly, the pivot assembly comprising:
   at least one resilient bushing; and
   a side-play restraint system, said resilient bushing being in contact with a portion of said restraint system, said side-play restraint system includes a fastener rigidly affixed to both of said support members, said fastener is removable from said support members, said restraint system further includes a sleeve, said sleeve in contact with said resilient bushing, said sleeve being in compressive contact with both of said support members, said restraint system further includes a key, said key being in contact with said sleeve and with one of said support members, thereby preventing said sleeve from rotating.

2. The pivot assembly of claim 1, wherein said side-play restraint system further includes a separate threaded member associated with each end of said fastener to rigidly affix said fastener to each of said support members.

3. The pivot assembly of claim 2, wherein said fastener is a flag pin having a flag end and a threaded end.

4. An agricultural tillage implement, comprising:
   a pair of support members; and
   a pivot assembly coupled between said support members, said pivot assembly including:
      at least one resilient bushing;
      a side-play restraint system, said resilient bushing being in contact with a portion of said restraint system, said side-play restraint system having:
         a fastener separately rigidly affixed to both of said support members, said fastener being removable from said support members,
         a sleeve in contact with said resilient bushing, said sleeve being in compressive contact with both of said support members; and
         a key in contact with said sleeve and with one of said support members, thereby preventing said sleeve from rotating.

5. The agricultural tillage implement of claim 4, wherein said side-play restraint system further includes a separate threaded member associated with each end of said fastener to rigidly affix said fastener to each of said support members.

6. The agricultural tillage implement of claim 5, wherein said fastener is a flag pin having a flag end and a threaded end.

* * * * *